July 16, 1935. L. MALKOVSKY 2,008,027
MACHINE FOR CUTTING CAMS
Filed Dec. 8, 1930 3 Sheets-Sheet 3
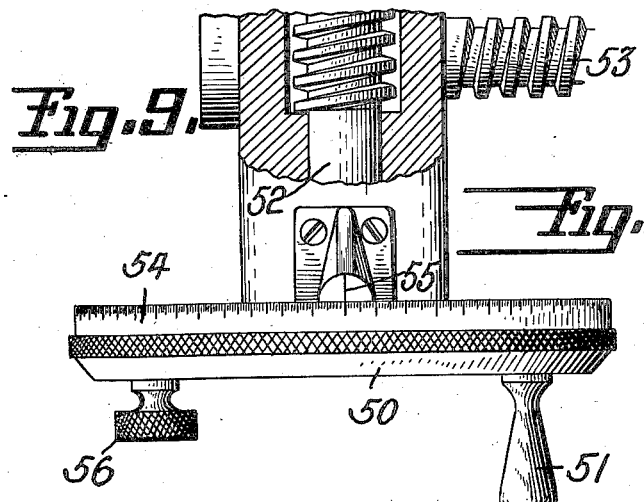
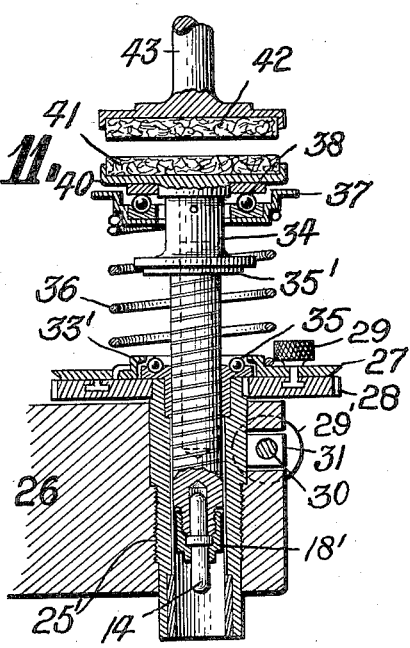
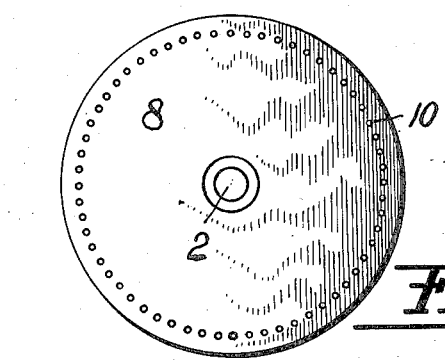
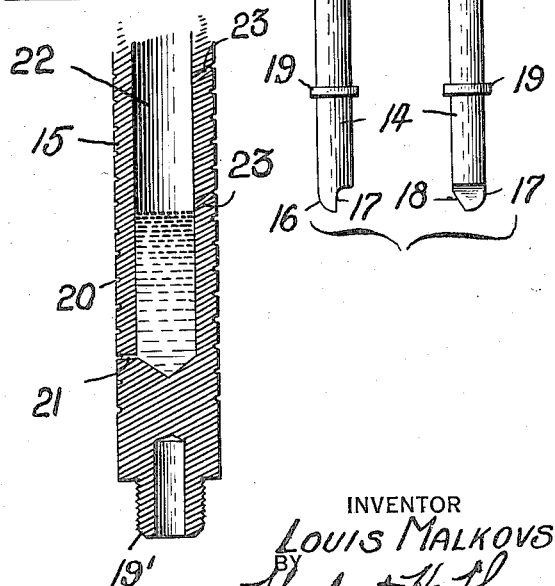
INVENTOR
LOUIS MALKOVSKY.
BY Herbert H. Thompson
his ATTORNEY.

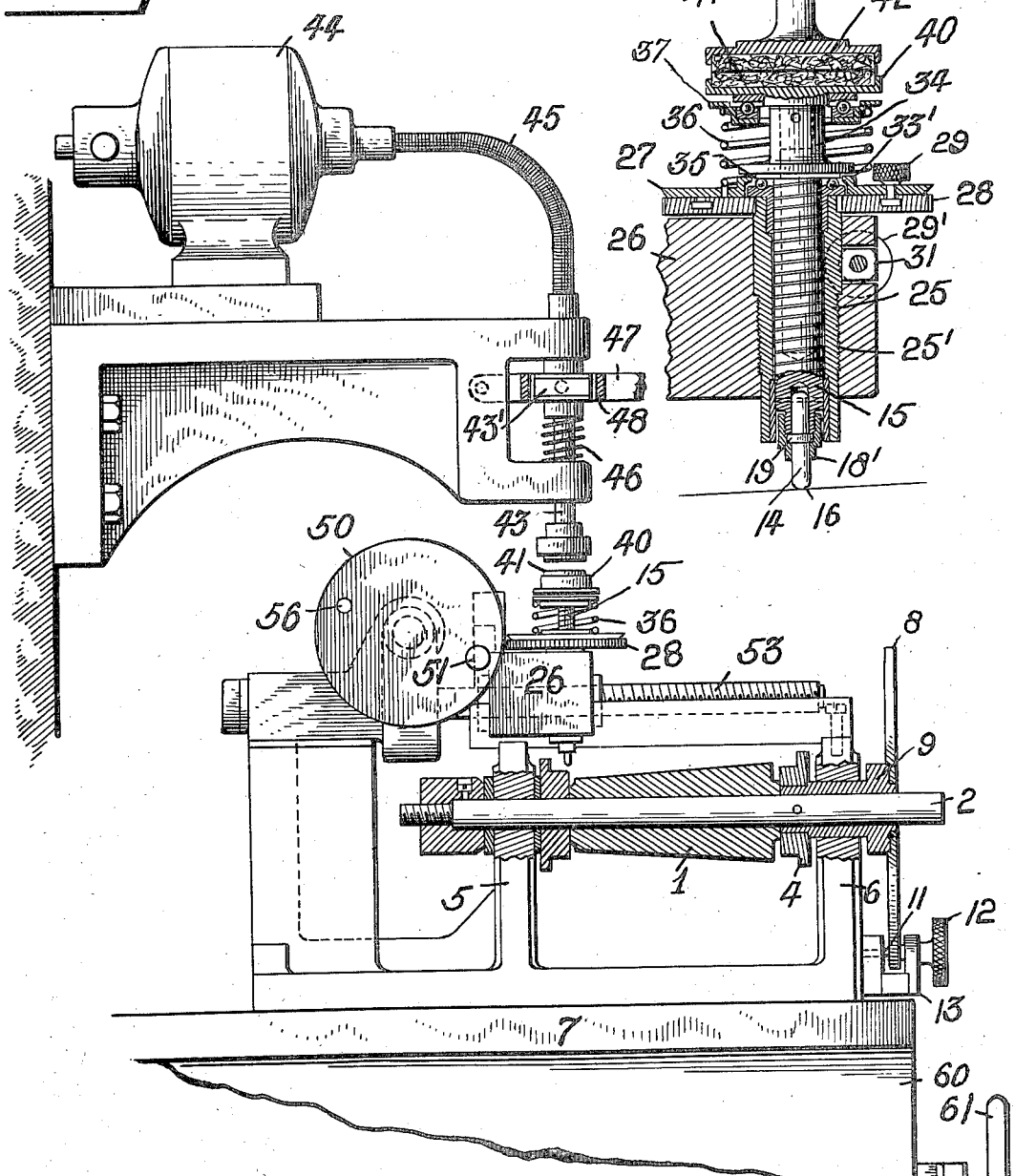

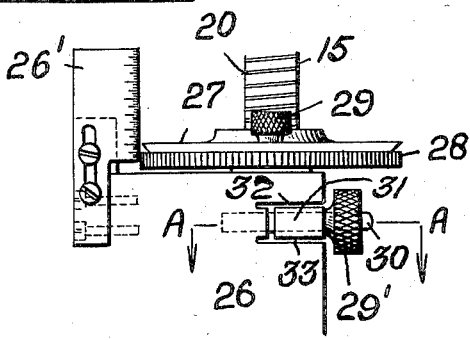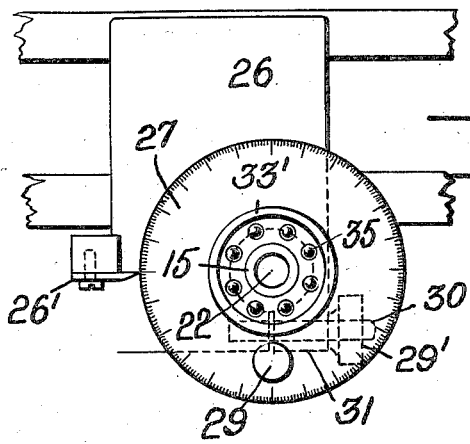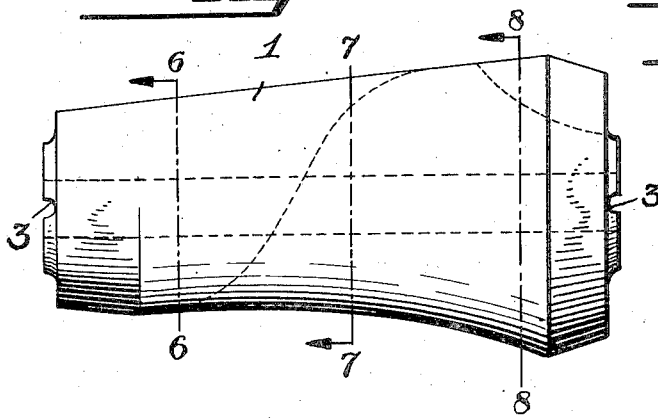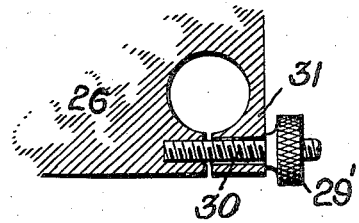

Patented July 16, 1935

2,008,027

UNITED STATES PATENT OFFICE 2,008,027

MACHINE FOR CUTTING CAMS

Louis Malkovsky, Floral Park, N. Y., assignor to Sperry Gyroscope Company, Inc., Brooklyn, N. Y., a corporation of New York Application December 8, 1930, Serial No. 500,767

2 Claims. (Cl. 77—5)

This invention relates to the art of cutting cams very accurately, especially to the art of shaping what may be termed three dimensional cams, that is, cylindrical cams, which not only vary in diameter from point to point in any one plane perpendicular to the axis of the cam but which also vary from point to point along the axis of the cam. Such cams are now employed in constructing computers for gun fire control apparatus, especially for anti-aircraft gun fire control in which the gun must be aimed in three planes. On account of the very high accuracy required in such cams down to .0001", ordinary methods of cam cutting had to be discarded. By my invention I shape the cam by what may be termed a "spotting" process which comprises drilling a large number of closely positioned holes in the cam, each hole being drilled by a special cutting tool to the predetermined depth ultimately required and finally filing off the high spots between the holes, leaving a microscopic spot at the base of each drilled hole, not more than .0001" in diameter. Such a spot has a depth of less than .00001" which is negligible.

Referring to the drawings in which the preferred form of the invention is shown, Fig. 1 is a side elevation, partly in section of my improved cam cutter, shown as an attachment for a drilling machine.

Fig. 2 is a vertical section on a larger scale through the drill holder and associated parts.

Fig. 3 is a detailed front view of the micrometer setting means for the depth of the hole to be drilled.

Fig. 4 is a top plan view of the same.

Fig. 4A is a detailed section taken on line A—A of Fig. 3, showing the locking clamp for the drill holder.

Fig. 5 is a side elevation of a finished three-dimensional cam, such as turned out by my machine.

Fig. 6 is a section taken approximately on line 6—6 of Fig. 5 but illustrating the process of forming a cam.

Fig. 7 is a similar section taken on line 7—7 of Fig. 5.

Fig. 8 is a similar section taken on line 8—8 of Fig. 5, this figure also showing the cam surface partially smoothed down after the holes are drilled.

Fig. 9 is a plan view, partly in section, of the graduated setting means for positioning the drill longitudinally of the cam.

Fig. 10 is a front view of the disc for positioning the cam rotatably about its axis.

Fig. 11 is a sectional view similar to Fig. 2 but with the parts in the raised or idle position.

Fig. 12 is an enlarged vertical section of the body of the drill holder spindle.

Fig. 13 shows two views of the special drill or boring tool which I prefer to employ.

Referring to Fig. 1, the cam blank 1 is placed upon a spindle 2 which is rotatably mounted on brackets 5 and 6 extending upwardly from the baseplate 7. The blank is connected to rotate with sleeve 9 and nut 4 thereon by a spline (not shown) on the nut face engaging with a spline-way 3 on the blank. Sleeve 9 may be turned and fastened in any desired position by means of a circular plate 8 secured to said sleeve on its outer face. Preferably the plate 8 is provided with a plurality of equi-distant holes 10 (Fig. 10) so that the plate may be used to turn the cam through successive small and equal angles and locked in each position by pin 11 extending from a slidable thumb piece 12 which may be pushed in and out of the small bracket 13 on the base. It will be understood that when it is desired to turn the disc into a new position the thumb piece 12 is pulled outwardly to withdraw the pin 11 from one of the holes 10, and the disc then turned through one notch and the thumb piece 12 is pushed back into the next hole.

As hereinbefore stated, I prefer to form the cam by successive drilling operations. For this purpose I provide a special drill 14 and drill holder 15. The drill or cutting tool is preferably formed from a cylindrical piece of high speed steel of which the cutting end thereof is first carefully ground to form a hemispherical end 16, the radius of which is the same as the radius of the cylinder. Then approximately one half of this hemisphere is cut off as shown in the left hand portion of Fig. 13. This forms a cutting edge 17. Finally the opposite edge 18 is ground off slightly to provide a clearance on the non-cutting edge for the chips cut off by the cutting edge. By having the spherical end on the cutter and by cutting to exactly a predetermined depth, a very accurately dimensioned cam is obtained.

The holder for the cutter is also of special design. A collar 19 is left near the center of the drill when turning down the drill and this collar is clamped between clamp nut 18' and the lower end of the driving spindle 19', which has a reduced threaded end on which the aforesaid nut is threaded. Said spindle is preferably provided with a small spiral groove 20 and one or two small holes 21 are also drilled through the walls thereof so that when oil is placed within the hollow bore 22 thereof it will ooze out through the lower hole 21, be carried upwardly by the spiral thread, thus lubricating the spindle, and will finally run back through the upper holes 23. The spindle is shown as surrounded by an adjustable sleeve 25 which is threaded in the supporting block 26 at 25'. At its upper end said sleeve is provided with a micrometer adjusting means which may comprise a vertical scale 26' graduated, say to .02", and the graduated disc 27, one complete rotation of which equals only one division on the vertical scale 26'. The graduations on the scale 27, therefore, may read to .0001". The scale is shown as loosely mounted on top of a knurled disc 28 but may be clamped thereto in any position by the thumb screw 29. Disc 28 is secured adjacent to the upper end of sleeve 25 so that rotation of the same rotates the sleeve and thus determines the position of the sleeve in the block 26. After the height of sleeve 25 is adjusted by turning the knurled piece 28, it is firmly clamped in place by tightening the thumb nut 29' on threaded shaft 30 which passes through a tongue 31 formed by cutting parallel slots 32 and 33 into one end of the block 26. The inner end of said screw is threaded solidly into the solid portion of the block so that by turning the nut the tongue piece is clamped tightly around the sleeve and prevents turning thereof. The disc 28 is shown as firmly clamped on the upper end of the sleeve 25 between a collar on the sleeve and the flared face of the thimble 33'. The upper surface of said face forms a limit stop for the collar 34 secured to the drill spindle 15 so that the downward movement of the drill is limited by the engagement of the collar with the thimble. Preferably I provide an anti-friction bearing to take this thrust and to prevent any wear on these bearing surfaces so that accuracy is maintained. As shown, I make the upper surface of the thimble in the form of a ball race having a plurality of balls 35 held therein which project slightly above the face of the thimble and bear against the reduced portion 35' of the collar 34 when the same is pressed into its downward position, as shown in Fig. 2. By using balls between the upper portion of the sleeve and the collar I also secure an important advantage over an ordinary surface to surface contact since when ordinary contact surfaces are employed between stops slight variations in the condition of the surface, such as due to grease or dirt, will change materially the point at which the device is stopped. By the use of a plurality of balls, however, extending entirely around the sleeve, the point contacts penetrate ordinary dust or oil films and also since the spindle is rotating the point at which the drill is stopped in its descent is a constant for any particular setting because slight variations in the diameter of the balls will then be immaterial and averaged out.

Fig. 11 shows the position of these parts when idle or before beginning an operation. In this position it will be noted that the spindle and drill have been raised upwardly by a compression spring 36, which bears at its lower end on discs 27 and 28 and bears at its upper end on a collar 37 loosely mounted around the upward extension of the collar 34. A ball bearing 38 is also provided between this collar and the thrust or driving block 40 so that all wear is also avoided at this point.

I prefer not to provide a positive drive between the drill and the power device so that the drill is only rotated when it is actually drilling and is released the instant the drilling operation ceases. By this means I avoid heating the drill and spindle much above the room temperature and thereby avoid the inaccuracy due to thermal expansion and contraction.

As shown, the drive consists of a friction block 41 mounted on thrust block 40 on the spindle, and a complementary friction block 42 on the shaft 43 of the power drive. Shaft 43 is shown as driven from an electric motor or other source of power 44 through flexible shaft 45. Means, such as a spring 46, is provided for normally maintaining the disc 42 above the disc 41. When drilling the operator grasps the handle 47 having a fork 48 therein engaging a grooved collar 43' on the shaft and presses the same downwardly to bring the frictional driving surfaces together as shown in Fig. 2. This rotates the drill, compresses the spring 36, and brings the drill into contact with the work. The hole is then drilled until collar 35' strikes the ball race 35 when the operator knows that the drill has reached its lower limit upon which he releases the handle and the drill is raised from the work and stopped. It will be understood that the operator of the machine is provided with a chart showing the exact depth to which each hole is to be bored. He then rotates the disc 8 one notch, sets his graduated disc 27 for the next reading indicated on his chart and repeats the drilling operation entirely around the circumference of the cam in one plane. Then the drill is advanced longitudinally along the cam about the diameter of the drill. This is effected by turning the disc 50 by handle 51. Said disc is secured to a worm shaft 52 which meshes through a double worm gear reduction (not shown) to drive the threaded shaft 53 through which the carriage block 26 is threaded. For accurately determining the amount of adjustment of the disc 50 I show a finely graduated ring 54 in back of the disc which is loosely mounted on the shaft 52 and is readable upon the index line 55. When beginning an operation this disc is set to read zero on the index 55 and is then clamped to the disc 50 by clamp screw 56. The handle 51 is then turned so that the carriage is moved through the proper distance for each series of circumferential holes. In order to maintain shafts 15 and 43 in alignment, it will be understood that the main carriage 60 of the drill press is moved oppositely an equal amount by turning handle 61. After all of the holes are bored the semifinished blank is removed from the machine and the balance of the operation completed by filing down the projections indicated at 57 in Figs. 6 and 7 which lie between holes. This must be done very carefully and I have found that the best results are obtained if the machinist files down the blank until the bottom of his drill hole is just barely visible under a microscope. Such little depressions are about .0001" in diameter and hence their depth is less than .00001" so that they cannot be felt with the hand. On the other hand it is desirable not to file away these markings because in filing them away the operator might get some of them filed away more than others with the result that an inaccurate cam would be formed. By having a spherical cutting edge each hole is drilled to exactly the same depth and the diameter of the little spots is much greater than the depth of the same so that they may be visible and yet the accuracy of the cam remain unaffected.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desired to secure by Letters Patent is:

1. A cam cutting machine comprising a power means, a rotatable drill spindle journalled in a fixed support below said power means, a clutch drive between said power means and spindle, means for advancing said power means to first engage said clutch and then feed the drill spindle, a threaded sleeve around the lower portion of said spindle and journalled in said support, a collar adjacent the upper end of said spindle, an annular ring of balls between said collar and the upper portion of said sleeve to form point contacts around the spindle, and micrometer setting means for said sleeve.

2. A cam cutting machine comprising a power means, a rotatable drill spindle journalled in a fixed support below said power means, a clutch drive between said power means and spindle, means for advancing said power means to first engage said clutch and then feed the drill spindle, a threaded sleeve around the lower portion of said spindle and journalled in said support, a collar adjacent the upper end of said spindle, an annular ring of balls between said collar and the upper portion of said sleeve to form point contacts around the spindle, micrometer setting means for said sleeve, said support for said sleeve being split, and means for clamping said support around the sleeve to lock the threads between the sleeve and support in any adjusted position.

LOUIS MALKOVSKY.